United States Patent
Flores

(10) Patent No.: US 11,802,579 B2
(45) Date of Patent: Oct. 31, 2023

(54) ELECTRICAL BOX CONNECTION TO A SUPPORT ROD

(71) Applicant: Victor Manuel Flores, Santa Cruz, CA (US)

(72) Inventor: Victor Manuel Flores, Santa Cruz, CA (US)

( * ) Notice: Subject to any disclaimer, the term of this patent is extended or adjusted under 35 U.S.C. 154(b) by 0 days.

(21) Appl. No.: 18/306,411

(22) Filed: Apr. 25, 2023

(65) Prior Publication Data

US 2023/0258209 A1   Aug. 17, 2023

Related U.S. Application Data

(63) Continuation-in-part of application No. 17/346,272, filed on Jun. 13, 2021, now Pat. No. 11,644,149.

(60) Provisional application No. 63/258,227, filed on Apr. 19, 2021.

(51) Int. Cl.
*B25B 11/00* (2006.01)
*F16B 2/06* (2006.01)
*H02G 3/08* (2006.01)

(52) U.S. Cl.
CPC ............... *F16B 2/065* (2013.01); *H02G 3/08* (2013.01)

(58) Field of Classification Search
CPC ........ F16M 13/022; F16B 2/065; H02G 3/08; H02G 3/30; H02G 3/081
See application file for complete search history.

(56) References Cited

U.S. PATENT DOCUMENTS

| | | | | |
|---|---|---|---|---|
| 2,956,798 A | * | 10/1960 | Briggs | H02G 3/126 269/254 R |
| 2,962,281 A | * | 11/1960 | Hodgson | H02G 3/125 269/254 R |
| 3,436,070 A | * | 4/1969 | Sanson | H02G 3/125 269/95 |
| 3,751,026 A | * | 8/1973 | Stickney | H02G 3/125 269/97 |
| 3,875,669 A | * | 4/1975 | Hull | H02G 3/125 D10/64 |
| 4,087,913 A | * | 5/1978 | Jackson | B28D 1/041 30/360 |
| 4,747,506 A | * | 5/1988 | Stuchlik, III | H02G 3/125 220/3.9 |
| 4,750,271 A | * | 6/1988 | Ericksen | B25B 5/06 269/904 |
| 4,757,967 A | * | 7/1988 | Delmore | H02G 3/126 248/27.1 |
| 4,850,115 A | * | 7/1989 | Price | H02G 3/125 D10/64 |
| 4,901,447 A | * | 2/1990 | Gottschalk | H02G 3/125 269/6 |

(Continued)

*Primary Examiner* — Amy J. Sterling
(74) *Attorney, Agent, or Firm* — Donald R. Boys; Central Coast Patent Agency LLC

(57) ABSTRACT

A two-part fitting has a first part with an elongated vertical cavity open on a first side, the cavity of a depth and width to accommodate a vertical support rod, with two male threaded posts extending horizontally on a second side of the first part opposite the first side, and a second part having a male threaded screw engaged in a female threaded hole through a portion of the second part. The fitting is characterized in that the first and second parts are adapted to join together enclosing the vertical support rod in a manner that the male threaded screw of the second part impinges on the vertical support rod.

15 Claims, 13 Drawing Sheets

(56) References Cited

U.S. PATENT DOCUMENTS

| | | | | | |
|---|---|---|---|---|---|
| 5,067,247 | A | * | 11/1991 | Milichichi | H02G 3/12 |
| | | | | | 33/DIG. 10 |
| 5,317,108 | A | * | 5/1994 | Prairie, Jr. | H02G 3/14 |
| | | | | | 174/67 |
| 5,348,274 | A | * | 9/1994 | Breen | H02G 1/00 |
| | | | | | 269/3 |
| 5,491,901 | A | * | 2/1996 | Parrino | H02G 3/126 |
| | | | | | 33/528 |
| 6,800,806 | B1 | * | 10/2004 | Grday | H02G 3/126 |
| | | | | | 439/535 |
| 7,173,186 | B1 | * | 2/2007 | Hageman | H02G 3/125 |
| | | | | | 174/57 |
| 7,771,094 | B2 | * | 8/2010 | Goode | H02G 3/126 |
| | | | | | 362/147 |
| 10,527,223 | B2 | * | 1/2020 | Fruh | F16M 13/02 |
| 10,868,413 | B1 | * | 12/2020 | Anshu | H01R 13/748 |
| 2014/0264220 | A1 | * | 9/2014 | Doyle | E04H 17/1417 |
| | | | | | 256/65.06 |

* cited by examiner

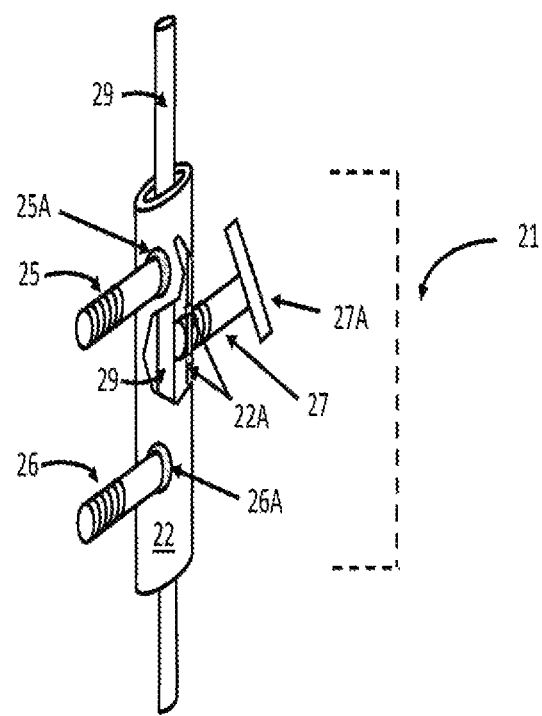

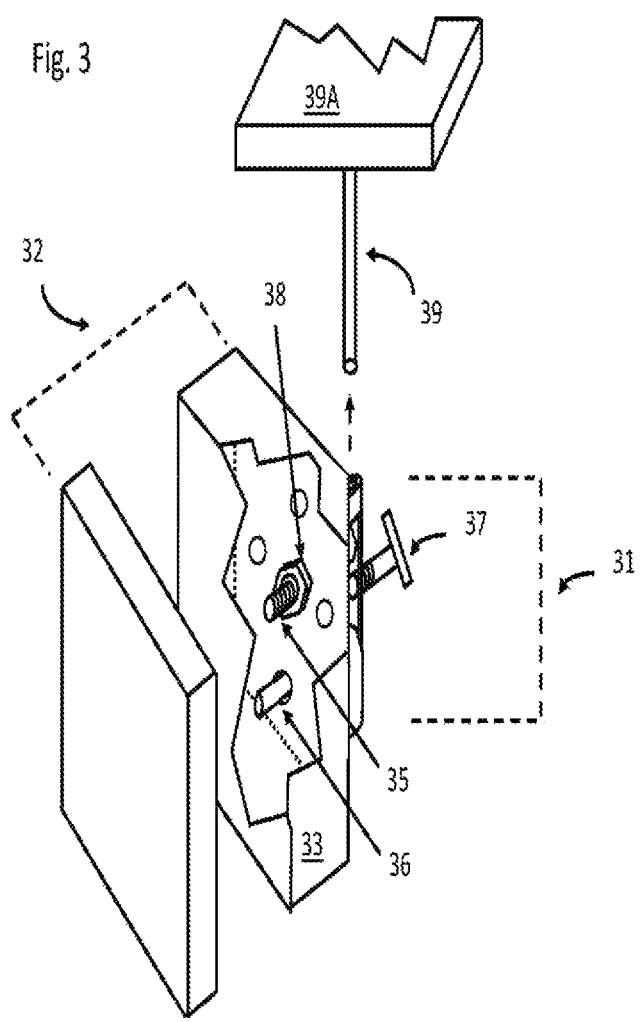

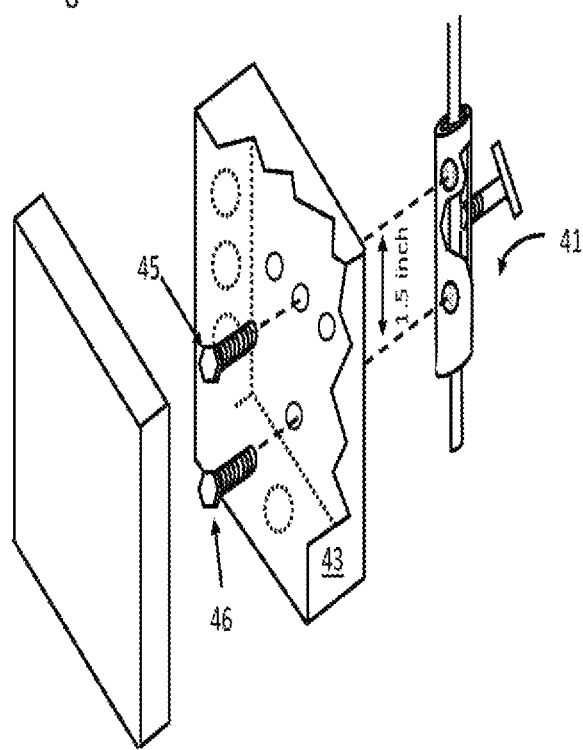

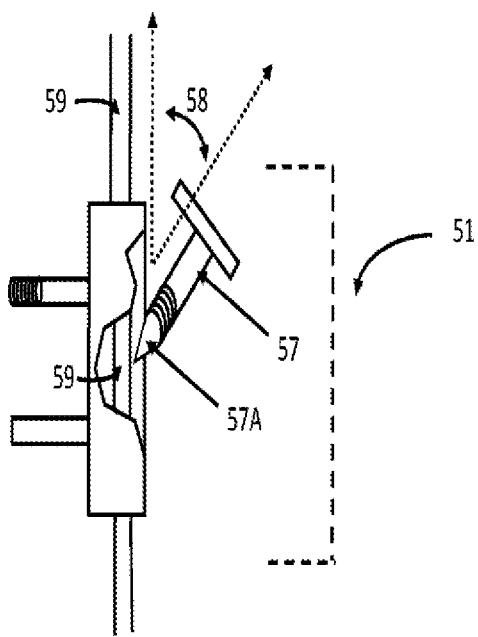

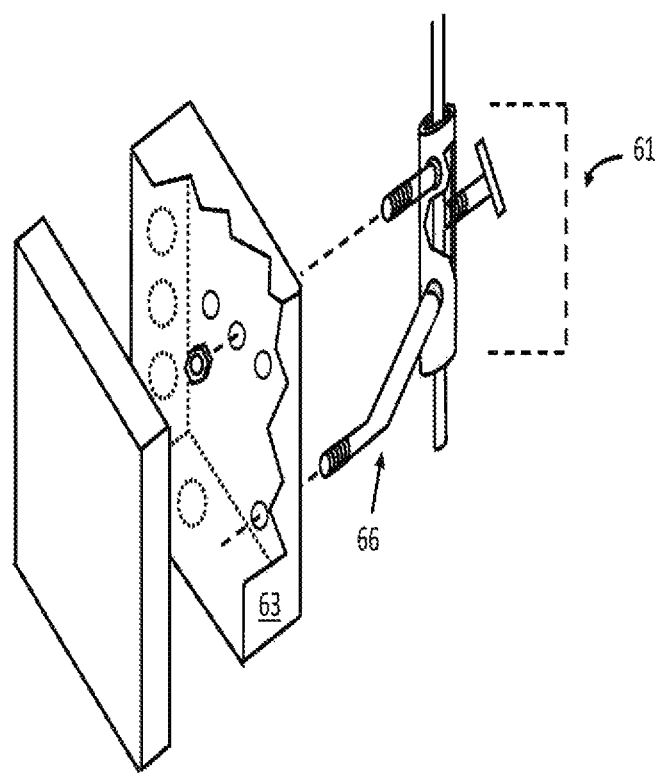

ELECTRICAL BOX CONNECTION TO A SUPPORT ROD

CROSS-REFERENCE TO RELATED APPLICATIONS

The present application is a continuation-in-part of co-pending U.S. application Ser. No. 17/346,272 filed Jun. 13, 2021, which claimed priority to Provisional Patent Application 63/258,227 dated Apr. 19, 2021. All disclosure of the parent applications is incorporated at least by reference.

BACKGROUND OF THE INVENTION

Field of the Invention

This invention relates to connecting an electrical box to a support rod that is suspended from a ceiling. Particularly, an invented fitting leads to a sturdy, but simple, method of installation.

Description of Related Art

Connecting electrical boxes to a support rod is a long-established practice in the electrical field. A support rod is anchored to the ceiling structure and hangs downward toward the floor.
One or more electrical boxes are attached to the support rod. An attachment between each electrical box and support rod is currently made by a friction retainer. Cables enter the electrical box through punch-out holes in the electrical box body. Some cables are heavy.

There are two major problems with the current technique, which uses a friction retainer.
First, heavy cables cause the installed electrical box to rotate because the friction retainer does not adequately prevent rotation. This happens frequently. Rotation occurs in the direction of the heaviest cables. Second, the electrical box slides downward toward the floor. This can occur long after the installation is complete. Sliding is the more serious problem. The installation must be redone.

These two problems have been recognized for a long time. But no satisfactory solution has been offered by the prior art. There is a need for a better way to install electrical boxes on a ceiling support rod.

BRIEF SUMMARY OF THE INVENTION

In one embodiment of the invention a two-part fitting is provided, comprising a first part having an elongated vertical cavity open on a first side, the cavity of a depth and width to accommodate a vertical support rod, with two male threaded posts extending horizontally on a second side of the first part opposite the first side, and a second part having a male threaded screw engaged in a female threaded hole through a portion of the second part. The first and second parts are adapted to join together enclosing the vertical support rod in a manner that the male threaded screw of the second part impinges on the vertical support rod.

In one embodiment of the invention the second part is a U-shaped structure having a first wall through which the male threaded screw passes, second and third walls extending from opposite edges of the first wall, and wings extending inward from ends of the second and third walls, the second part forming a rectangular enclosure adapted to slide over the first part, the wings retaining the parts in engagement surrounding the vertical support rod. Also, in one embodiment the first part forms a U-shaped structure having opposite sides extending away from the direction of the male threaded posts, the opposite sides each having a matching slot, and the second part is a flat plate adapted to engage the matching slots, spanning the opposite sides of the first part, the male threaded screw passing through a female threaded hole in the flat plate, such that with the first and second part engaged the male threaded screw impinges on the vertical support rod. In one embodiment the male threaded posts are one-quarter inch diameter spaced apart by 1.5 inches. In one embodiment the male threaded screw in the female threaded hole in the second part is directed at an angle to horizontal. And in one embodiment the fitting further comprises an electrical box having a pair of holes in one side, with the male threaded posts engaged in the pair of holes and fastened with threaded nuts.

In another aspect of the invention a system supporting an electrical box is provided, comprising a vertical support rod fastened at top and bottom, an electrical box having two holes spaced apart in one surface, and a two-part fitting having a first part with an elongated vertical cavity open on a first side, the cavity of a depth and width to accommodate the vertical support rod, with two male threaded posts extending horizontally on a second side of the first part opposite the first side, securely fastened by threaded nuts through the two holes spaced apart on a surface of the electrical box, and a second part having a male threaded screw engaged in a female threaded hole through a portion of the second part, wherein the first and second parts are joined together enclosing the vertical support rod in a manner that the male threaded screw of the second part impinges on the vertical support rod, supporting the electrical box on the support rod.

In one embodiment of the system the second part is a U-shaped structure having a first wall through which the male threaded screw passes, second and third walls extending from opposite edges of the first wall, and wings extending inward from ends of the second and third walls, the second part forming a rectangular enclosure adapted to slide over the first part, the wings retaining the parts in engagement surrounding the vertical support rod. Also, in one embodiment the first part forms a U-shaped structure having opposite sides extending away from the direction of the male threaded posts, the opposite sides each having a matching slot, and the second part is a flat plate adapted to engage the matching slots, spanning the opposite sides of the first part, the male threaded screw passing through a female threaded hole in the flat plate, such that with the first and second part engaged the male threaded screw impinges on the vertical support rod. Also, in one embodiment the male threaded posts are one-quarter inch diameter spaced apart by 1.5 inches, and in one embodiment the male threaded screw in the female threaded hole in the second part is directed at an angle to horizontal.

In yet another aspect of the invention a method for supporting an electrical box in construction is provided, comprising implementing a two-part fitting, with a first part having an elongated vertical cavity open on a first side, the cavity of a depth and width to accommodate a vertical support rod, with two male threaded posts extending horizontally on a second side of the first part opposite the first side, and a second part having a male threaded screw engaged in a female threaded hole through a portion of the second part, wherein the first and second parts are adapted to join together enclosing the vertical support rod in a manner that the male threaded screw of the second part impinges on the vertical support rod, engaging the elongated vertical cavity of the first part with the vertical support rod, engaging the second part with the first part enclosing the vertical support rod with the male threaded screw of the second part impinging on the vertical support rod, tightening the male threaded screw against the support rod, and passing the male threaded posts through matching holes in a surface of the electrical box and securing with threaded nuts, thus securing the electrical box to the vertical support rod.

In one embodiment of the method the second part is a U-shaped structure having a first wall through which the male threaded screw passes, second and third walls extending from opposite edges of the first wall, and wings extending inward from ends of the second and third walls, the second part forming a rectangular enclosure, the step for engaging the second part with the first part involving sliding the second part over the first part, the wings retaining the parts in engagement surrounding the vertical support rod.

In one embodiment of the method the first part forms a U-shaped structure having opposite sides extending away from the direction of the male threaded posts, the opposite sides each having a matching slot, and the second part is a flat plate adapted to engage the matching slots, spanning the opposite sides of the first part, the step for engaging the second part with the first part involving engaging the flat plate in the matching slots. And in one embodiment the male threaded screw in the female threaded hole in the second part is directed at an angle to horizontal, and the step for tightening the male threaded screw against the support rod directs the screw at an angle other than ninety degrees with the support rod.

BRIEF DESCRIPTION OF THE SEVERAL VIEWS OF THE DRAWINGS

FIG. 2 shows an invented fitting positioned around a support rod.

FIG. 3 shows the invented fitting positioned on the back plate of the electrical box.

FIG. 4 shows an embodiment wherein two screws are first removed from the fitting.

FIG. 5 shows an embodiment in side-view.

FIG. 6 shows an embodiment wherein the electrical box does not have standard holes distanced 1.5 inches apart.

DETAILED DESCRIPTION OF THE INVENTION

Figures 1A, 1B, 1C:
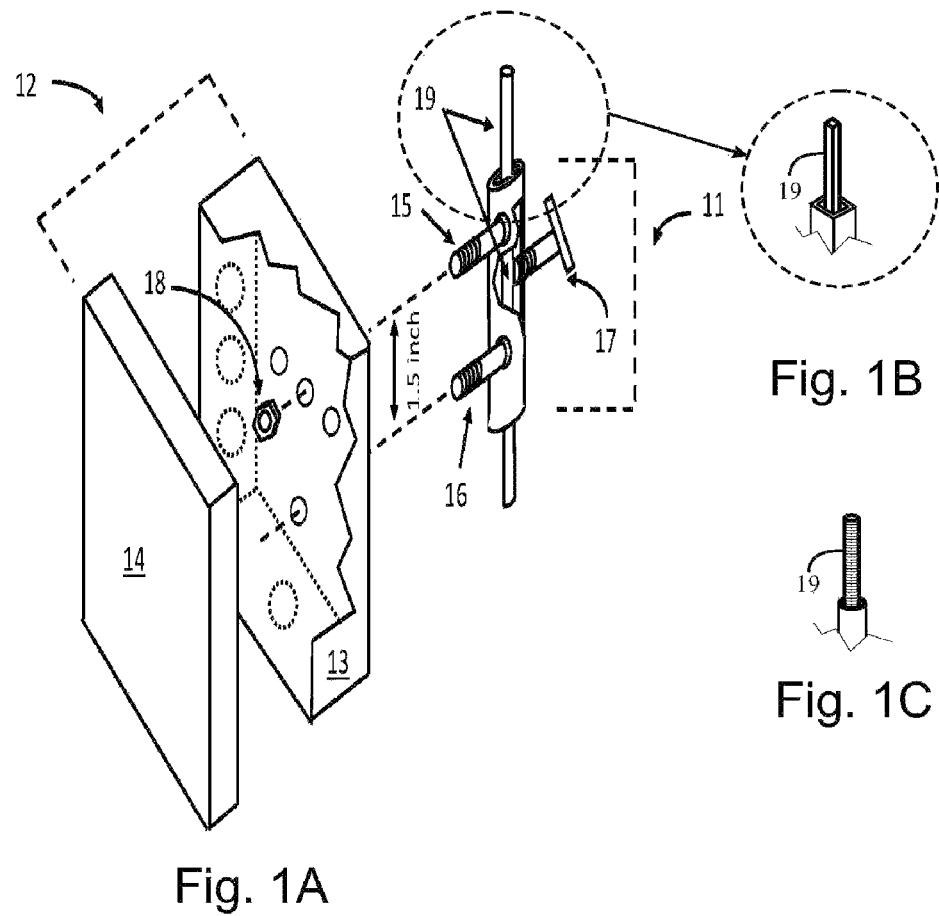
FIG. 1A shows an exploded diagram of the invention with a round support rod.
FIG. 1B illustrates a polygonal support rod and a fitting with a polygonal hole for the support rod.
FIG. 1C illustrates a support rod that is either threaded or grooved.

FIG. 1A shows an exploded diagram of the invention with a round support rod. FIG. 1B illustrates a polygonal support rod and a fitting with a polygonal hole for the support rod. FIG. 1C illustrates a support rod that is either threaded or grooved. FIGS. 1A, 1B and 1C illustrate structural features of an invented fitting plus how the fitting combines with both an electrical box and a support rod. Both the electrical box and the fitting are drawn in a cutaway format. As shown, both pins passing through the back plate of the electrical box are threaded to receive a nut. But threading for the alignment pin is optional. This embodiment shows a spacing of 1.5 inches (center to center) between the attachment pin and alignment pin. Many standard electrical boxes have a hole spacing of 1.5 inches (center to center). So, this embodiment fits with standard commercial electrical boxes without modification.

Refer to FIGS. 1A, 1B and 1C. An invented fitting 11 connects to the back plate 13 of an electrical box 12. In this diagram, the front plate 14 of the electrical box has been opened to see inside. Both fitting 11 and the back plate 13 are cut away.

The invented fitting 11 also connects to a support rod 19, which is normally anchored to the ceiling and hangs downward. Hence, the invented fitting 11 ties both the electrical box 12 and the support rod 19 together. In FIG. 1A support rod 19 and a hole for the support rod in the invented fitting both have a round cross-section. In FIG. 1B the support rod and the hole are shown with polygonal cross section. In FIG. 1C the support rod is shown to be threaded or grooved.

In this embodiment, an attachment pin 15 and an alignment pin 16 pass through the back plate 13 to make a connection. Both pins 15,16 are shown as threaded to mate with a nut 18 inside the electrical box 12. However, threading the alignment pin 16 is optional since its designed function is to prevent rotation of the electrical box 12 around the fitting 11. No mating nut is shown for alignment pin 16 to support this point.

In FIG. 1, attachment pin 15 is responsible for making a solid connection between the invented fitting 11 and the back plate 13. As drawn for this embodiment, a nut 18 mates with the threading of the attachment pin 15. But other means of connecting are available within the scope of the invention and within the skill of an electrician possessing ordinary skill. This inventive concept is further not limited to threaded attachment pins 15. For example, a cotter key (not shown) and a receiving hole (not shown) in an unthreaded attachment pin would work equally well.

One of ordinary skill could select alternate attachment hardware from a standard catalog of connectors.

A rod screw 17 holds the support rod 19 firmly to prevent dropping. This screw may be a standard screw or a set screw for extra holding power.

In combination, the rod screw 17, the attachment pin 15 and the alignment pin 16 solve the problems of the prior art. Neither dropping (sliding) nor rotation are expected. When an electrician returns the next day, the electrical box will be in the same position. Repairs or re-installation are unnecessary.

FIG. 2 focuses on details for an invented fitting 21. As drawn, the main body 22 is a hollow cylinder, which concentrically surrounds a cylindrical support rod 29. If the support rod has a cross section that is a triangle, square, rectangular or other polygonal shape, the main body may employ the same shape to surround the support rod 29 with minimal wobble.

Loosening the rod screw 27 allows the invented fitting 21 to slide upward and downward on the support rod 29. When the proper height is reached, the rod screw 27 is tightened to lock-in that height. A torque handle 27A allows for higher manual force on the support rod 29. It makes installation easier. However, the torque handle 27A is optional and not a required feature of the invented fitting 21.

The attachment pin 25 can be solidly fixed or removably fixed. If the attachment pin 25 is removably fixed, the mating surface 25A may be a female threaded orifice in the fitting body 22. If attachment pin 25 is solidly fixed, the mating surface 25A may be a welded or soldered joint.

The alignment pin 26 can also be solidly fixed or removably fixed. The mating surface 26A may be a female thread for a removable alignment pin 26. Soldering or welding might be used for a solidly fixed alignment pin 26.

One of ordinary skill has multiple options for fixed or removable mating surfaces 25A, 26A. Choices selected from an engineering catalog or manual offer multiple high—The inventor's prototype was made from a steel body 22 with threaded mating surfaces 25A, 26A. Wall thickness was 2 mm, which was adequate for threading. An intentional effort to strip the thread of the attachment pin's 25 mating surface 25A failed. The mating surface held strong.

In commercial quantities, the fitting 21 may be manufactured as a cast part.

Referring back to FIG. 1, note that most electrical boxes 12 are manufactured with precise standard dimensions. First, for most electrical boxes 12 the distance between nearest-neighbor back plate 13 holes is precisely 1.5 inches (center to center). Second, the diameter of each back plate 13 hole is slightly greater than 0.25 inch, which allows 0.25-inch pins to pass through easily.

Return to FIG. 2. Capitalizing on standard commercial dimensions leads to a preferred embodiment. In this embodiment, attachment pins 25 and alignment pins 26 both have a 0.25-inch diameter. Furthermore, the spacing between pins 25,26 is 1.5 inches. This means that the pins 25,26 exactly match the electrical box. No extra holes need to be drilled, which saves time and money for the installation. Also, the connection between the invented fitting and the electrical box has a sturdy feel.

Refer to FIG. 3. The method of installation begins by installing a support rod 39 from ceiling 39A. Alternately an already-installed support rod is used. The order of the following steps is not fixed. An electrician will determine the order, based on working space, convenience, and personal preference.

Connecting the invented fitting 31 to the back plate 33 of an electrical box 32 is accomplished by inserting the attachment pin 35 and the alignment pin 36 through two pre-existing holes in the back plate 33 as shown in FIG. 3. The location and size of the pre-existing holes is standardized for electrical boxes. For common electrical boxes, hole spacing of 1.5 inches is present.

The attachment pin 35 is locked in place. In FIG. 3, a nut 38 is used. Other means of locking are within the scope of the invention since alternate choices are based on choosing from a known list of standard options with a high probability of success. The alignment pin 36 does not have to be locked in place, but it can be. It is optional.

With the rod screw 37 retracted, the fitting 31 is positioned around the support rod. In this condition, the fitting slides up-and-down freely. When the appropriate height of the electrical box 32 is achieved, the rod screw 37 is tightened into the support rod 39 to maintain that height.

Minimal variations to the installation method are possible, but they remain within the inventive concept. For example, refer to FIG. 4. Rather than directing the attachment pin 45 and the alignment pin 46 from the fitting 41 into the back plate 43, the direction is reversed. The pins 45,46 are directed from the inside of the back plate to the fitting 41. The pins 45,46 may be taken from a previously assembled fitting 41, or different pins could be used. Either way, the fitting 41 and the method of use are not meaningfully altered.

Refer to FIG. 5. In this fitting 51 embodiment, the rod screw 57 has a sharp point 57A, which allows penetration into the support rod 59. The rod screw 57 is also placed at a downward angle 58 into the support rod 59. This provides a very secure connection between the support rod 59 and the rod screw 57. The probability of the electrical box slipping downward is low. The more weight that an electrical box exerts on the fitting 51, the more the sharp point 57A digs into the support rod 59.

Refer to FIG. 6. Here fitting 61 has been modified to fit a large or non-standard electrical box. Holes in the back plate 63 are not 1.5 inches apart. The alignment pin 66 has been shaped to fit the holes that are available. Functionally, the effect is the same. The alignment pin 66 prevents rotation.

Figure 7:
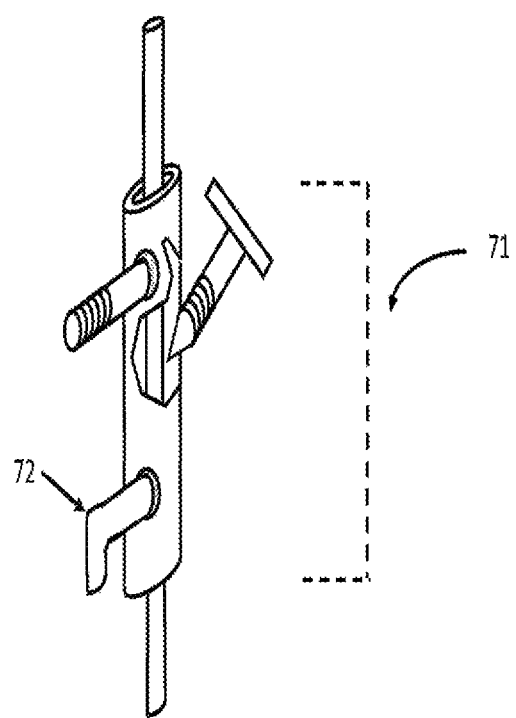
FIG. 7 shows an embodiment with a bent alignment pin.

Refer to FIG. 7. A bent alignment pin 72 has been included into the fitting 71 for safety. When the fitting 71 is installed, the bent alignment pin 72 remains close to the inside of the back plate. Hence, the bent alignment pin 72 does not extend far into the electrical box and does not interfere with wiring inside the electrical box.

In one preferred method, the steps are (1) attaching a support rod to a ceiling or using a pre-attached support rod, (2) connecting the invented fitting to the back plate of an electrical box, wherein an attachment pin and an alignment pin pass through holes in back plate of the electrical box (3) sliding the invented fitting over the support rod with the rod screw retracted, and (4) fixing the height of the electrical-box-fitting combination with the rod screw.

Materials of fitting construction may vary. The inventor's preference is steel with a 2 mm wall thickness to prevent stripping of threads, but this is not a requirement.

In this invention, the invented fitting and the invented method are dependent on each other. To the inventor's knowledge, the invented fitting does not have an application beyond electrical box installation, and the method is specific for electrical box installation.

A will be apparent to the skilled person that fitting 11 described above has a body with a vertical passage through which a support rod, such as support rod 19 described above must pass. It is necessary in assembly to slide the fitting over the support rod from a free end of the support rod. Typically support rod 19 is a threaded rod suspended from a ceiling element. With the lower end free.

In some circumstances there are one or more wires fastened between ceiling elements and floor elements. These wires are available to be used as support rods for supporting such as electrical boxes, but, being fastened both above and below cannot be used with a fitting like fitting 11. To use a wire fastened top and bottom as a support rod for an electrical box it is necessary that the fitting to attach to the box and the wire be adapted to be able to assemble the fitting to a wire that is already fastened top and bottom.

Figure 8:
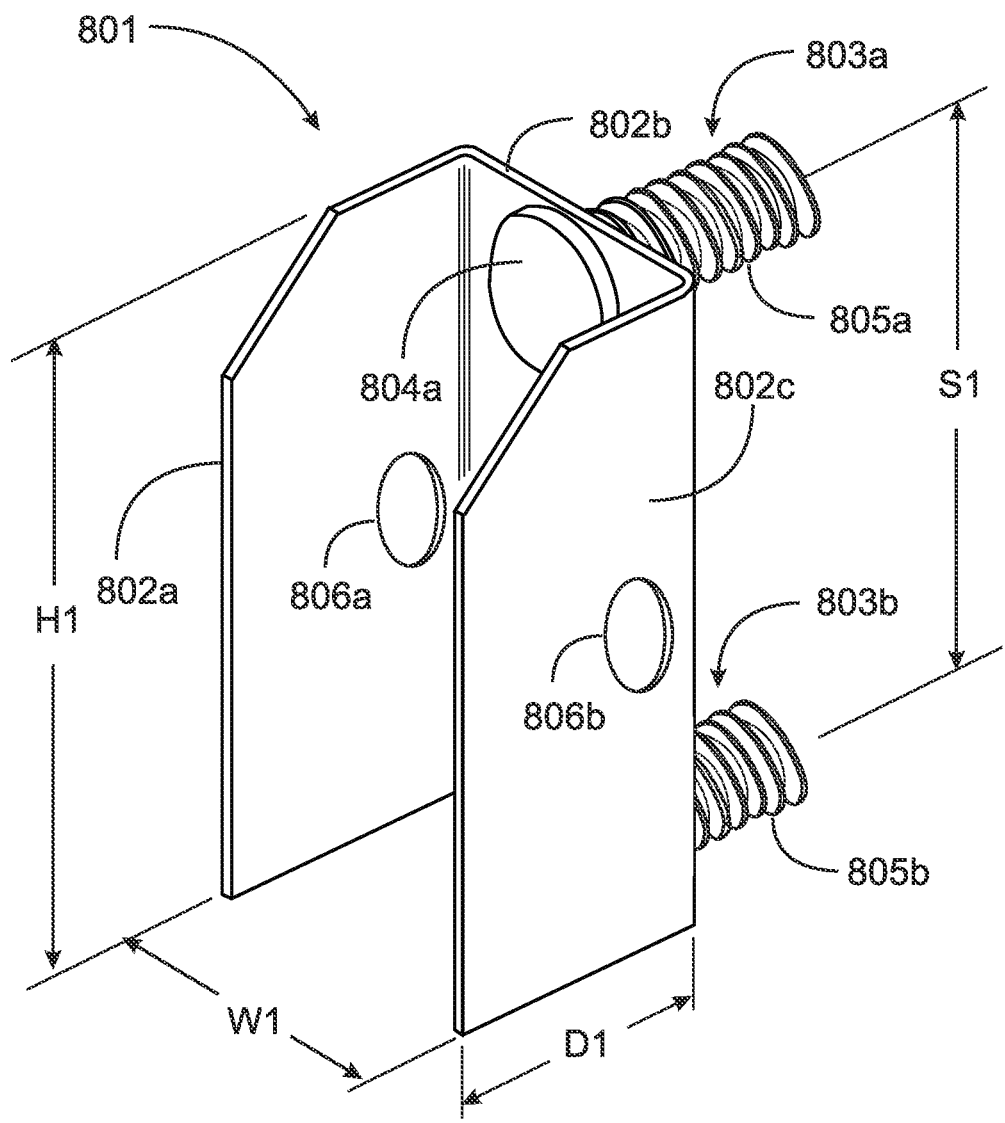
FIG. 8 is a perspective view of a first part of a fitting in an embodiment of the invention.

FIG. 8 is a perspective view of a first part 801 of a two-part fitting in an embodiment of the invention. Part 801 has a U-shaped body, in this example formed from sheet metal, that has three planar portions 802a, 802b and 802c. Portion 802b is a closed side of the U-shape and has two male-threaded extensions 803A and 803b extending horizontally away from part 801 and spaced apart by a dimension S1. In one embodiment S1 is 1.5 inches but may be different in some other embodiments.

Extension 803a has a male threaded rod portion 805a and a head portion 804a. The rod portion is inserted from the inside through a hole in side portion 802b and the head portion is spot-welded or otherwise rigidly affixed to side portion 802b. Similarly, extension 803b is placed through side portion 802b from the inside and the head of that extension (not seen in FIG. 8) is spot-welded or otherwise affixed to side portion 802b.

Part 801 in this example has a height H1, a depth D1 and a width W1, all of which may vary somewhat in different embodiments of the invention. In some embodiments the support rod to be enclosed by the two-part fitting may be a ¼ inch diameter threaded rod, and in some other embodiments may be a ⅜ inch diameter threaded rod. It follows that W1 and D1 need be large enough to accommodate the different support rods sizes. In one embodiment W1 and D1 may each be ⅝ inch, but this is not a limitation in the invention.

In one embodiment holes 806a and 806b are implemented through side portions 802a and 802b. Holes 806a and 806b may be a slip fit for a ¼ diameter rod.

Figure 9:
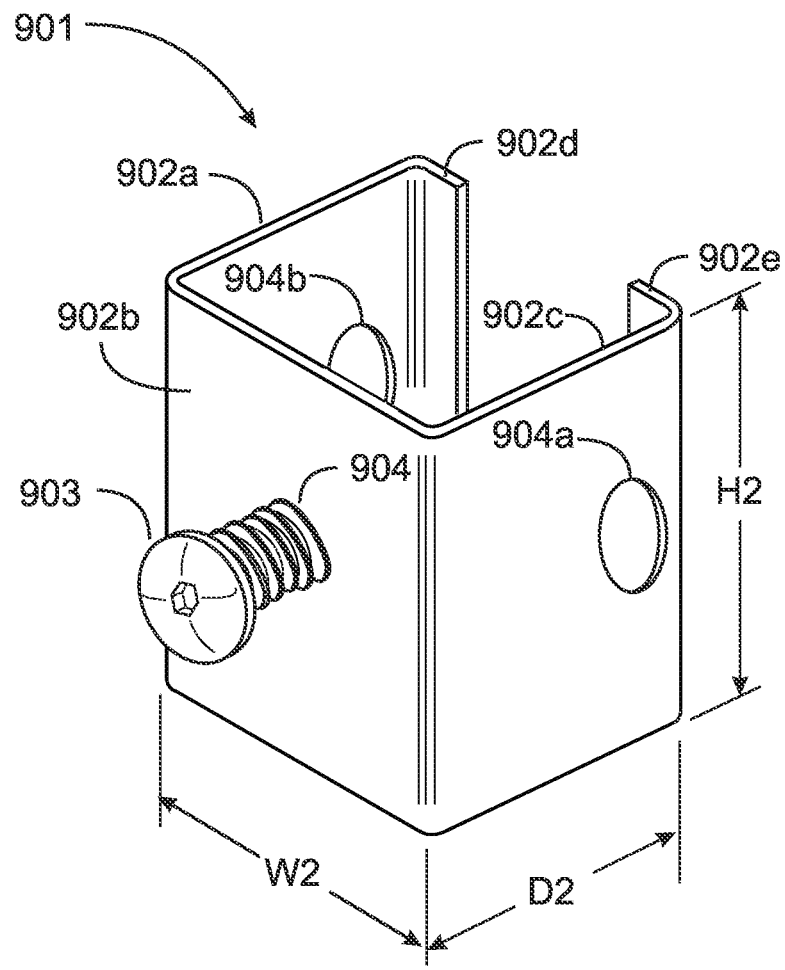
FIG. 9 is a perspective view of a second part of a fitting in an embodiment of the invention.

FIG. 9 is a perspective view of a second part 901 of a fitting in an embodiment of the invention. Part 901 in this example is formed from sheet metal in this example in a U-shape with sides 902a, 902b and 902c, and two additional wings 902d and 902e. A threaded hole 904 is centrally located in side 902b, and a conventional screw fastener 903 is threaded in the hole. Screw 903 in this example may be a ¼ inch diameter screw, and in this example is a socket-head screw. The diameter may vary somewhat in other embodiments and the form of the head may vary as well. In some case a hex-head screw may be used. In one embodiment holes 904a and 904b, implemented as a slip fit for a one-quarter diameter rod, are made in sides 902a and 902c as shown.

Part 901 is adapted to fit over part 801 as is illustrated and described below. Dimensions W2 and D2 have to large enough that part 901 will engage over part 801, and height H2 is less than height H1.

Figure 10:
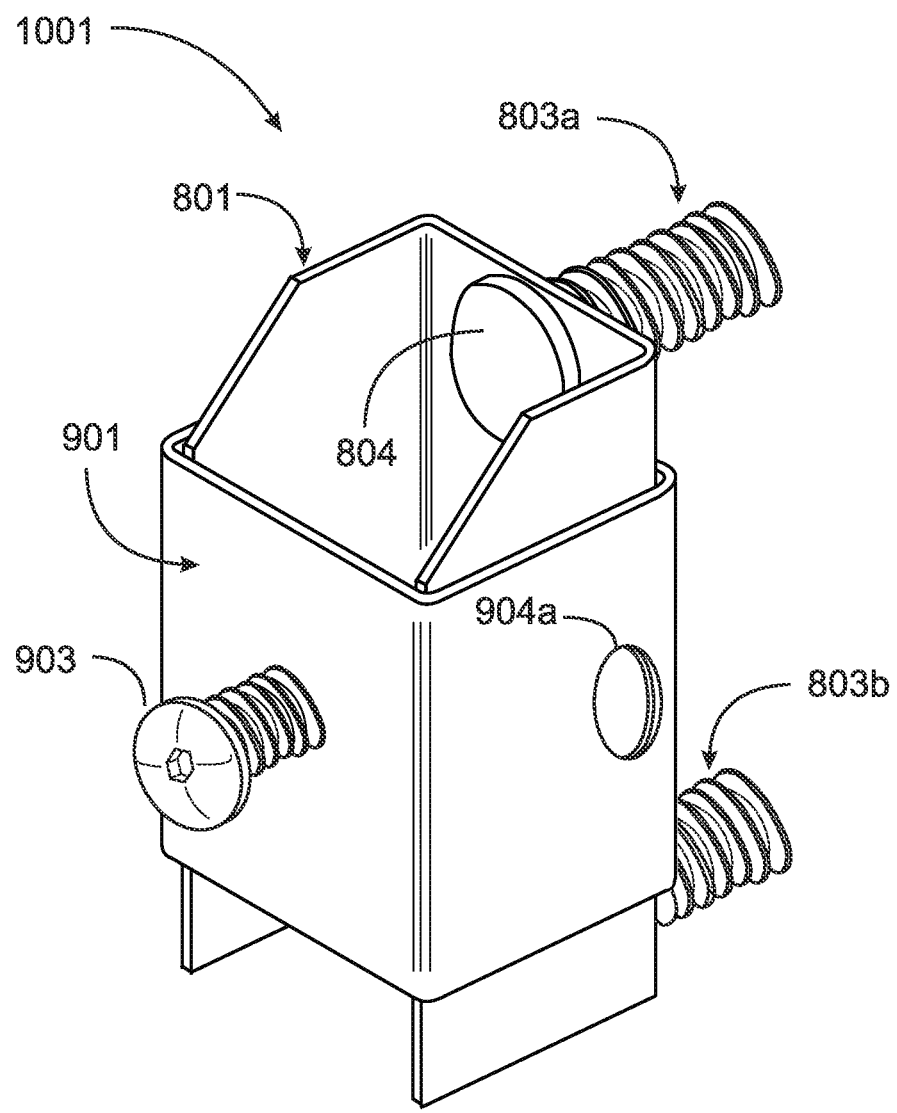
FIG. 10 is a perspective view of a two-part fitting in an embodiment of the invention.

FIG. 10 is a perspective view of an assembled two-part fitting 1001 in an embodiment of the invention. Part 901 fits over part 801 as shown, with wings 902d and 902e holding the two parts together. A support rod (not shown) passes vertically through the vertical rectangular opening formed by the assembly and screw 903 may be tightened to engage the support rod and fix the fitting onto the support rod. The holes 806a, 806b, 904a, and 904b line up, providing passage for a one-quarter inch diameter rod, enabling the composite fitting to be used with a support rod through the rectangular opening formed by the assembly of the two parts, or a support rod through the holes 806a, 806b, 904a, and 904b. The screw 903 will bear on the support rod in either circumstance.

It was described above with reference to FIG. 5 the rod screw may be installed at an angle and may also have a sharp point. Rod screw 903 in one embodiment may also be at an angle and may also have a sharp point, which allows penetration into the support rod.

Referring now to previous FIGS. 1-7 the skilled person will understand that male-threaded extensions 803a and 803b may be engaged through two holes in an electrical box (see FIG. 1) and the electrical box may be thus suspended as described above. Fitting 1001 may be fixed to the support rod ad then assembled to an electrical box, or the fitting may be assembled to an electrical box, and then opened to engage a support rod. The order of operations is variable.

Figure 11:
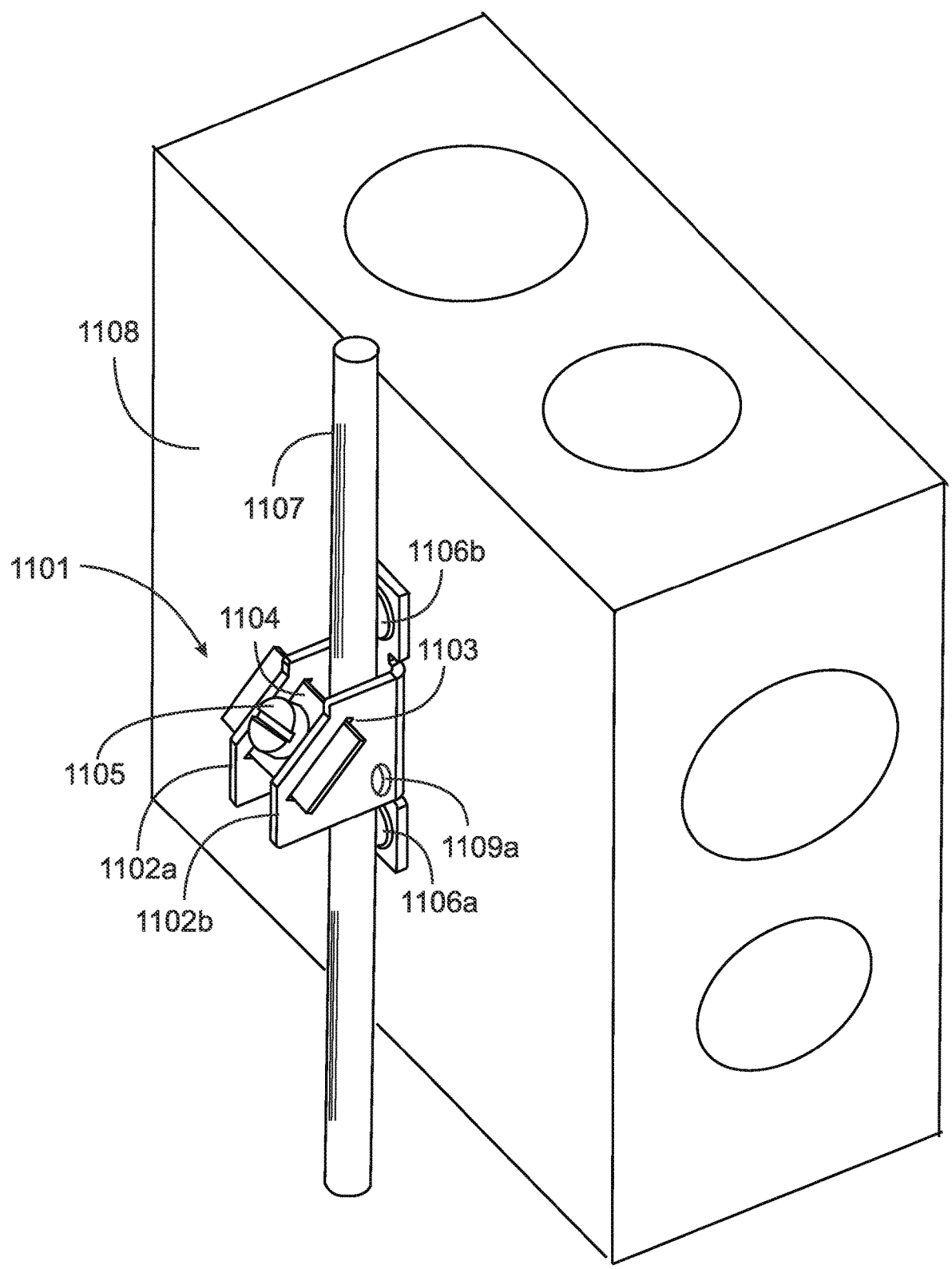
FIG. 11 is a perspective view of an electrical box and a two-part fitting in another embodiment of the invention.

FIG. 11 illustrates a two-part fitting 1101 provided in another aspect of the invention to accomplish the same functions of fitting 1001 of FIG. 10. Fitting 1101 has a U-shaped bracket with opposite sides 1102a and 1102b. The bracket has wings with threaded extensions 1106a and 1106b fastening the bracket through two holes in an electrical box 1108. The two holes may be spaced at 1.5 inches as described above. There is in this example a rectangular slot 1103 in each side 1102a and 1102b of the bracket, and a flat plate 1104 with a central threaded hole is adapted to engage the slots on each side. With the flat plate in place a screw 1105 may be engaged in the central threaded hole of plate 1104 to engage a support rod 1107.

In practice a user may assemble the bracket with sides 1102a and 1102b to the electrical box, slide plate 1104 through the slots 1103 and engage screw 1105 to affix the bracket to the support rod. The angle of the slots 1103 causes screw 1105 to engage the support rod at an angle to avoid sliding on the support rod after assembly.

In one embodiment holes 1109a and 1109b are provided in sides 1102a and 1102b in a diameter providing a slip fit for a one-quarter inch diameter rod. (Hole 1109b cannot be seen in FIG. 11). These holes provide for the fitting to be used with a support rod passing between side 1102a and 1102b as shown or passing through holes 1109a and 1109b.

In FIG. 11 flat plate 1104 is shown to be substantially wider than the width between sides 1102a and 1102b, such that the plate protrudes on each side of the U-shaped bracket. The protrusion enables a user to more readily grasp the plate when assembling the plate through slot 1103.

In FIG. 11 slot 1103 is shown as a straight slot and plate 1104 as a rectangular plate. In a variation the slot and the plate are shaped differently to provide additional functionality.

Figure 12A:
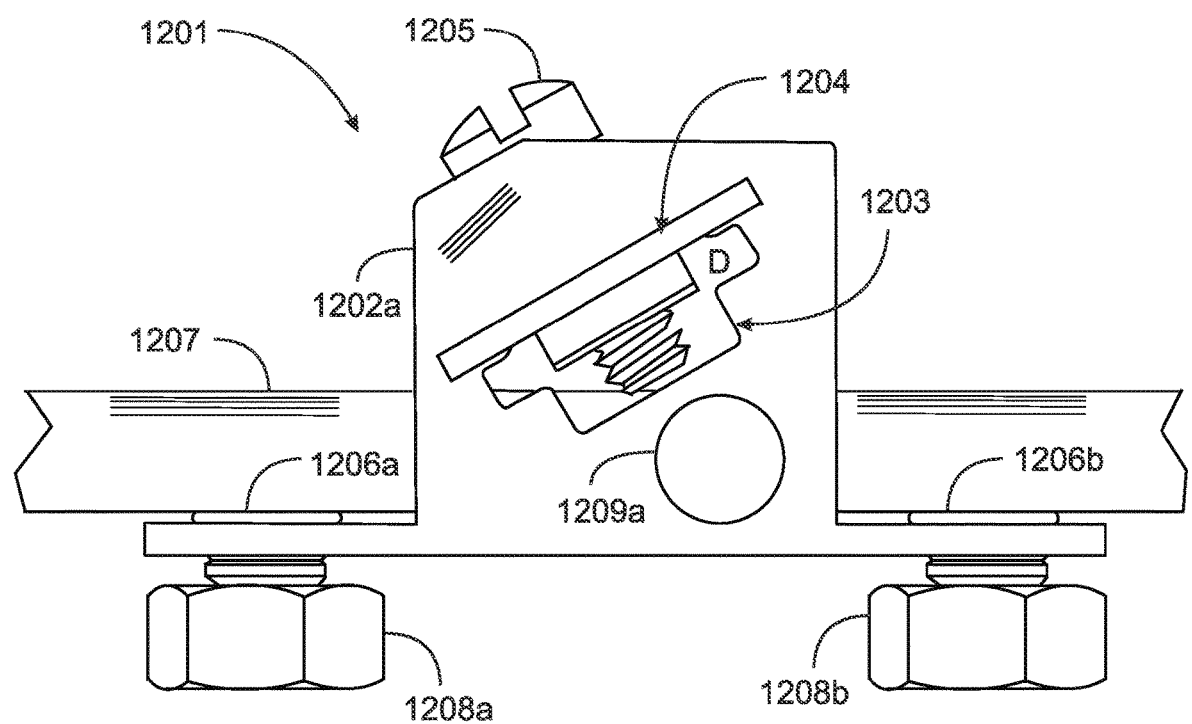
FIG. 12A is a side elevation view of an alternative two-part fitting in an embodiment of the invention.
Figure 12B:
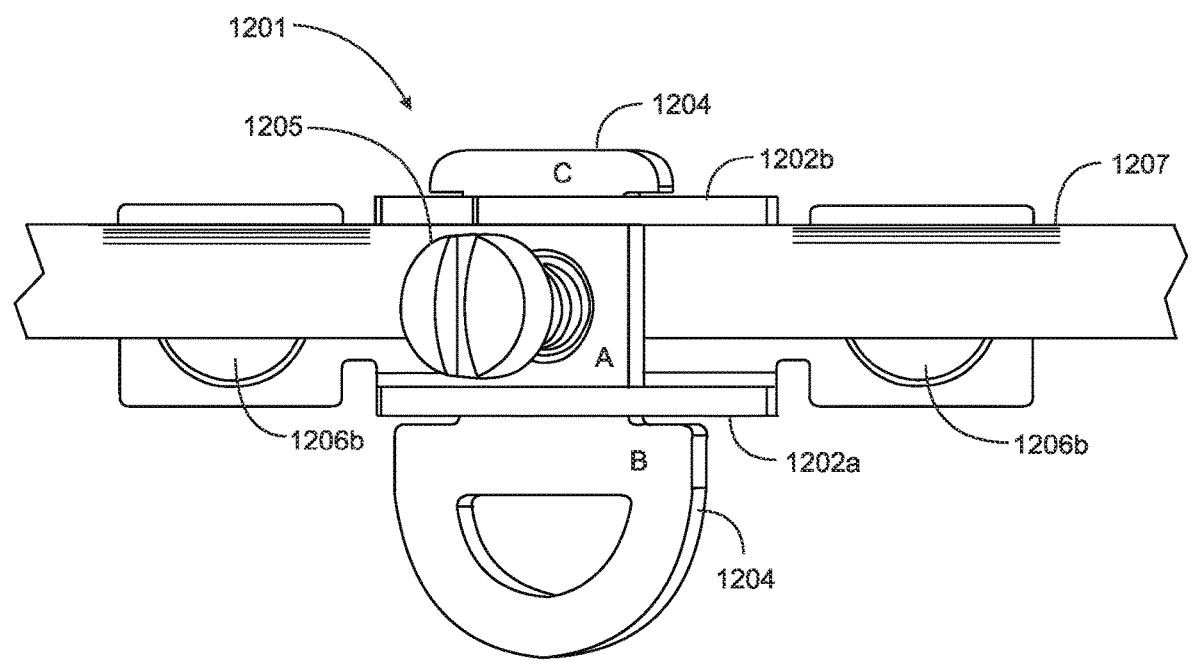
FIG. 12B is a top plan view of the fitting of FIG. 12A.

FIG. 12A is a side elevation view of an apparatus 1201 in an alternative embodiment of apparatus 1101 of FIG. 11. The main bracket has sides 1202a and 1202b, but only 1202a may be seen in this figure. Opening 1203 is analogous to slot 1103 in FIG. 11 but may be seen to have different widths and levels. Plate 1204 is also different in shape from plate 1103 of FIG. 11. The shape of plate 1204 is shown in FIG. 12B and described below. A screw 1205 is threaded through a threaded hole in plate 1204, similar to Threaded extensions 1206a and 1206b are the same as threaded extensions 1106a and 1106b in FIG. 11, and serve to attach fitting 1201 to an electrical box with nuts 1208a and 1208b. Through holes 1209a and 1209b are provided through sides 1202a and 1202b of the fitting to allow for the fitting to be used with a support rod passing through holes 1209a and 1209b. Only hole 1209a may be seen in this view.

FIG. 12B is a top plan view of the fitting apparatus 1201 of FIG. 12A. The shape of plate 1204 may be seen in better detail in this view. A central portion of plate 1204 labeled region "A" has a minimum width which is the width of a top region of opening 1203. Plate 1204 has a wide region "B" which is an end of the plate a user will grasp when inserting the plate into opening 1203. The opposite end, region "C" is the end that will protrude from side 1202b when the plate is fully inserted.

The width of region "C" of plate 1204 is the width of a region marked "D" of opening 1203 in side 1202a. A user may insert plate 1204 through region "D" completely through the side 1202a and 1202b, then the plate may be raised such that region "A" of the plate engages a more narrow upper region of opening 1203. The plate is then retained and does not withdraw, and screw 1205 may be extended to engage support rod 1207.

It will be apparent to the skilled artisan that there are a variety of ways that two parts may be adapted to engage to surround and clamp to a support rod anchored on both ends, and to engage an electrical box to accomplish the purpose of supporting the electrical box on the support rod. The essential feature for this functionality is that there are two parts each open on one side to be able to place the parts over the support rod, and engagement interfaces on the parts so that the parts may be joined around the support rod, with one of the parts having a screw to engage the support rod.

The skilled artisan will recognize that the embodiments illustrated and described are exemplary and are not limiting to the scope of the invention, which scope is limited only by the claims.

The invention claimed is:

1. A two-part fitting, comprising:
   a first part having an elongated vertical cavity open on a first side, the cavity of a depth and width to accommodate a vertical support rod, with two male threaded posts extending horizontally on a second side of the first part opposite the first side; and
   a second part having a male threaded screw engaged in a female threaded hole through a portion of the second part;
   characterized in that the first and second parts are adapted to join together enclosing the vertical support rod in a manner that the male threaded screw of the second part impinges on the vertical support rod.

2. The two-part fitting of claim 1 wherein the second part is a U-shaped structure having a first wall through which the male threaded screw passes, second and third walls extending from opposite edges of the first wall, and wings extending inward from ends of the second and third walls, the second part forming a rectangular enclosure adapted to slide over the first part, the wings retaining the parts in engagement surrounding the vertical support rod.

3. The two-part fitting of claim 1 wherein the first part forms a U-shaped structure having opposite sides extending away from the direction of the male threaded posts, the opposite sides each having a matching slot, and the second part is a flat plate adapted to engage the matching slots, spanning the opposite sides of the first part, the male threaded screw passing through a female threaded hole in the flat plate, such that with the first and second part engaged the male threaded screw impinges on the vertical support rod.

4. The two-part fitting of claim 1 wherein the male threaded posts are one-quarter inch diameter spaced apart by 1.5 inches.

5. The two-part fitting of claim 1 wherein the male threaded screw in the female threaded hole in the second part is directed at an angle to horizontal.

6. The two-part fitting of claim 1 further comprising an electrical box having a pair of holes in one side, with the male threaded posts engaged in the pair of holes and fastened with threaded nuts.

7. A system supporting an electrical box, comprising:
   a vertical support rod fastened at top and bottom;
   an electrical box having two holes spaced apart in one surface; and
   a two-part fitting having a first part with an elongated vertical cavity open on a first side, the cavity of a depth and width to accommodate the vertical support rod, with two male threaded posts extending horizontally on a second side of the first part opposite the first side, securely fastened by threaded nuts through the two holes spaced apart on a surface of the electrical box, and a second part having a male threaded screw engaged in a female threaded hole through a portion of the second part, wherein the first and second parts are joined together enclosing the vertical support rod in a manner that the male threaded screw of the second part impinges on the vertical support rod, supporting the electrical box on the support rod.

8. The system of claim 7 wherein the second part is a U-shaped structure having a first wall through which the male threaded screw passes, second and third walls extending from opposite edges of the first wall, and wings extending inward from ends of the second and third walls, the second part forming a rectangular enclosure adapted to slide over the first part, the wings retaining the parts in engagement surrounding the vertical support rod.

9. The system of claim 7 wherein the first part forms a U-shaped structure having opposite sides extending away from the direction of the male threaded posts, the opposite sides each having a matching slot, and the second part is a flat plate adapted to engage the matching slots, spanning the opposite sides of the first part, the male threaded screw passing through a female threaded hole in the flat plate, such that with the first and second part engaged the male threaded screw impinges on the vertical support rod.

10. The system of claim 7 wherein the male threaded posts are one-quarter inch diameter spaced apart by 1.5 inches.

11. The system of claim 7 wherein the male threaded screw in the female threaded hole in the second part is directed at an angle to horizontal.

12. A method for supporting an electrical box in construction, comprising:
    implementing a two-part fitting, with a first part having an elongated vertical cavity open on a first side, the cavity of a depth and width to accommodate a vertical support rod, with two male threaded posts extending horizontally on a second side of the first part opposite the first side, and a second part having a male threaded screw engaged in a female threaded hole through a portion of the second part, wherein the first and second parts are adapted to join together enclosing the vertical support rod in a manner that the male threaded screw of the second part impinges on the vertical support rod;
    engaging the elongated vertical cavity of the first part with the vertical support rod;
    engaging the second part with the first part enclosing the vertical support rod with the male threaded screw of the second part impinging on the vertical support rod;
    tightening the male threaded screw against the support rod; and
    passing the male threaded posts through matching holes in a surface of the electrical box and securing with threaded nuts, thus securing the electrical box to the vertical support rod.

13. The method of claim 12 wherein the second part is a U-shaped structure having a first wall through which the male threaded screw passes, second and third walls extending from opposite edges of the first wall, and wings extending inward from ends of the second and third walls, the second part forming a rectangular enclosure, the step for engaging the second part with the first part involving sliding the second part over the first part, the wings retaining the parts in engagement surrounding the vertical support rod.

14. The method of claim 12 wherein the first part forms a U-shaped structure having opposite sides extending away from the direction of the male threaded posts, the opposite sides each having a matching slot, and the second part is a flat plate adapted to engage the matching slots, spanning the opposite sides of the first part, the step for engaging the second part with the first part involving engaging the flat plate in the matching slots.

15. The method of claim 12 wherein the male threaded screw in the female threaded hole in the second part is directed at an angle to horizontal, and the step for tightening the male threaded screw against the support rod directs the screw at an angle other than ninety degrees with the support rod.

* * * * *